Jan. 6, 1953          J. E. DIEHL          2,624,769

AMMETER WITH SWINGING PERMANENT MAGNET

Filed April 23, 1948

INVENTOR.
John E. Diehl
BY Brown, Critchlow, Flick & Peckham
his Attorneys.

Patented Jan. 6, 1953

2,624,769

UNITED STATES PATENT OFFICE 2,624,769

AMMETER WITH SWINGING PERMANENT MAGNET

John E. Diehl, St. Marys, Pa., assignor to Stackpole Carbon Company, St. Marys, Pa., a corporation of Pennsylvania Application April 23, 1948, Serial No. 22,810

5 Claims. (Cl. 171—95)

This invention relates to ammeters, and has among its objects the provision of an ammeter which is of extremely simple construction, which can be calibrated very easily, which always returns to the zero setting quickly and accurately when the current through it is turned off, which is dependable and accurate in operation, which is inexpensive to make and assemble, and which is not affected by vibrations of the vehicle on which the ammeter is mounted.

In accordance with this invention a current-carrying member has a central portion of magnetic metal, such as steel, provided centrally with a bearing. A bearing member is spaced from this central bearing, and a pivot pin has its opposite ends rotatably supported by the two bearings. A permanent bar magnet is rigidly mounted on the pin and normally is held in a predetermined position relative to the central portion of the current-carrying member by its magnetic attraction for it. A pointer is operatively connected to the pin so that it will be swung with it when current flowing through the current-carrying member swings the magnet. Preferably, the current-carrying member is a strip of steel, but it may be provided on the side nearest the magnet with a layer of a better current conductor, such as copper. Or, the current-carrying member may be a non-magnetic metal conductor provided centrally with a keeper bar of magnetic metal for normally centering the magnet. To permit the meter to be calibrated easily, the bearing at the center of the current-carrying member may be formed by the inner end of a screw threaded in a hole extending through that member, and the opposite end of the pivot pin may be slidably and rotatably mounted in an opening in the bearing member that is spaced from the screw. Consequently, by adjusting the screw the magnet can be moved closer to or farther away from the current-carrying member to vary the distance between the magnet and the steel central portion of that member. This will control the restoring force exerted on the magnet. When this force is great, the needle will not swing so far away from zero position when a given current is passed through the current-carrying member as when the restoring force is less.

Figure 1:
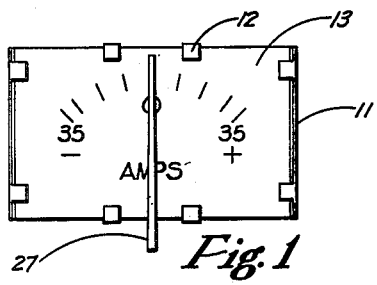
Figure 2:
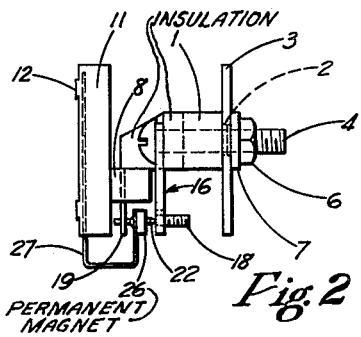
Figure 3:
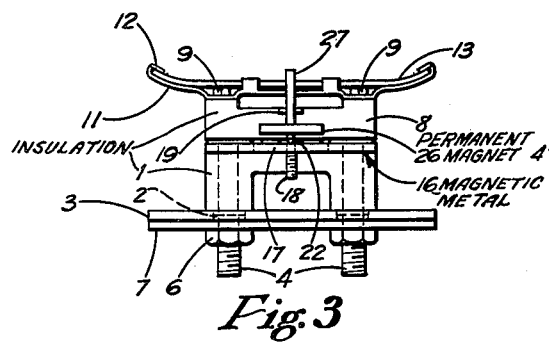
Figure 4:
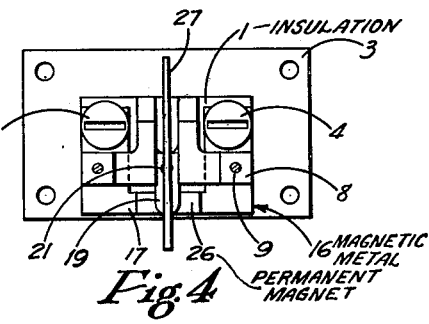
Figure 5:
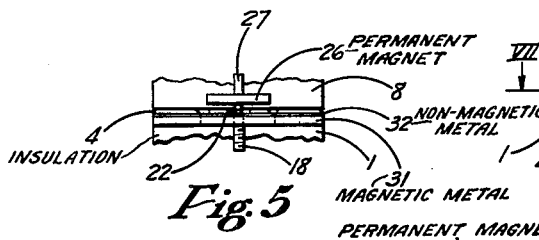
Figure 6:
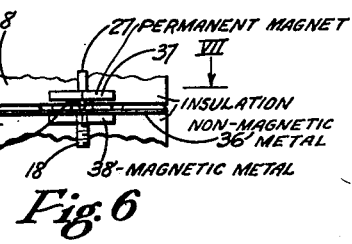
Figure 7:
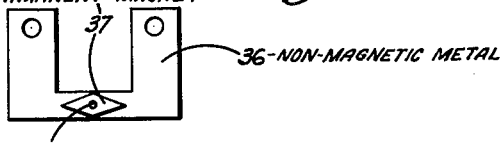
Figure 8:
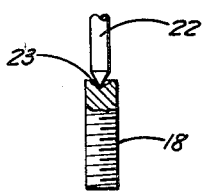

The invention is illustrated in the accompanying drawings in which Figs. 1, 2, and 3 are front, end, and bottom views, respectively, of my ammeter; Fig. 4 is a front view with the dial and its supporting bracket removed; Figs. 5 and 6 are fragmentary bottom views of two modifications of the invention; Fig. 7 is a front view of the magnet and current-carrying member taken on the line VII—VII of Fig. 6; and Fig. 8 is an enlarged fragmentary view showing the pivoted connection between the pivot pin and bearing screw.

Referring to Figs. 1 to 4 of the drawings, an insulating block 1 has legs provided with passages surrounded at their rear ends by short projections 2 integral with the legs. These projections extend into openings in a metal mounting plate 3. Extending through the block passages and plate are screws 4 that are held in place by nuts 6 which engage a strip 7 of insulation against the rear face of the place. The rear ends of the screws are adapted to be attached to wires of a circuit in which the ammeter is to be connected.

Integrally connected to the central portion of the front face of block 1 is a dial support 8 that projects downward and forward from the block. The end portions of this support are provided with threaded openings that receive screws 9 which fasten to the support a rectangular metal bracket 11 provided around its periphery with lugs 12 that are bent over the edges of a dial 13 to clamp it against the bracket. This dial is provided with the usual scale graduated to indicate amperes, with zero at its center.

The heads of screws 4 extending through block 1 clamp against its front face, the ends of a current-carrying member 16 made of magnetic metal, by which is meant a metal which will be attracted by a magnet. Steel is such a metal. The strip of steel that is the current conductor preferably is in the form of a square U (Fig. 4) having side portions extending downward from screws 4 and integrally connected at their lower ends by a narrow straight rectangular portion 17, hereinafter referred to as the keeper portion of the strip. The keeper portion is provided centrally with a threaded hole in which a bearing screw 18 is mounted. In front of this hole there is a bearing member 19 of non-magnetic material which projects down from a slot in dial support 8 to which the bearing member is connected by a suitable fastener 21 (Fig. 4). The bearing member has an opening through it in line with the screw. One end of a pivot pin 22 is rotatably and slidably mounted in this opening, while the other end is rotatably supported by a bearing surface at the front or inner end of the bearing screw. Preferably, as shown in Fig. 8, this surface is formed by providing the screw with a conical axial recess 23 for receiving the pointed rear end of the pivot pin.

Mounted on the central portion of pin 22 is a permanent bar magnet 26 which produces a strong magnetic flux. For example, the magnet may be made from about 6% copper, 12% cobalt, 10% aluminum, 17% nickel, and the balance iron. A needle or pointer 27 is operatively connected to the pivot pin, such as by rigidly attaching it to the center of the magnet or to the pin itself. The pointer extends downward and then forward beneath the dial and then up in front of it.

It will be understood that the magnetic attraction of the magnet for the keeper portion 17 of the steel strip will hold the magnet in a predetermined position relative to the keeper when no current is flowing through the strip. It is preferred that the magnet be rectangular, in which case the keeper portion of the strip should be substantially the same width as the magnet for best results. With this arrangement, wherein the keeper is directly behind the magnet, the magnet normally will align itself with the keeper and hold itself in a horizontal position, as shown in Fig. 4. However, when an electric current flows through the steel strip, the metering force thereby created will tilt the magnet against the resistance of the restoring force which tries to hold the magnet in line with the keeper, and the magnet and pointer therefore will be swung to the left or the right, depending upon the direction in which the current is flowing through the strip. Also, as the strength of the metering force depends on the strength of the current, the amount of deflection of the pointer will indicate the amperes of current flowing through the strip.

After the meter has been assembled it is readily calibrated by connecting it in an electric circuit of a given number of amperes, such as 35, so that the pointer will be swung to one side or the other. If the pointer swings past the 35 mark on the dial, the bearing screw 18 is turned to permit the magnet to move closer to the steel strip, which it can do because of its sliding fit with the bearing member. The attraction of the magnet for the strip holds the rear end of the pivot pin in the recessed end of the screw. When the magnet moves closer to the strip, the restoring force on the magnet increases and draws the pointer back toward zero. By turning the bearing screw the proper amount, the pointer can be made to overlie the 35 mark. Assuming that it is a 35 ampere current, the ammeter is properly calibrated and can be maintained that way by locking the screw with a dab of paint or the like. If the pointer first does not swing as far as the 35 mark, the bearing screw is turned in the opposite direction to push the magnet away from the strip so that the restoring force will be reduced. As soon as the circuit is broken in either case, the restoring force on the magnet will swing it all of the way back to horizontal or normal position and hold it there. Because in all cases the magnetic flux of this magnet is so strong, the pointer does not waver as the vehicle on which the ammeter is mounted shakes and vibrates.

It is possible to increase the metering force by providing the front face of the steel strip with a coating or layer of a non-magnetic material, such as copper, which is a better conductor of electricity than steel. A copper clad steel strip 31, as shown in Fig. 5, is ideal for this purpose. The current will flow more freely through the copper strip 32 than through the steel and thus exert a greater metering force on the magnet. The copper strip can be coextensive with the steel strip or shorter, just so it underlies the magnet 26.

In the modification shown in Figs. 6 and 7 the current-conducting strip 36 is made of non-magnetic material, such as copper or brass, which readily conducts the current. To attract the magnet 27 to zero position, a keeper bar 38 of magnetic metal, such as steel, is secured to the back of the straight central portion of the strip. The magnet will align itself with the keeper bar when no current is flowing through the strip. Although the magnet and keeper bar may be rectangular as shown in the first embodiment, they also may be made in other shapes, provided both are substantially the same size and shape. Thus, the magnet and bar may be made diamond shape as shown. The ends of the magnet will be attracted to the ends of the keeper bar and thus will align itself with the bar.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An ammeter comprising a current-carrying member having a steel central portion with a centrally located threaded hole through it, a screw threaded in said hole and having a bearing surface at its inner end, a bearing element spaced from said surface and having an opening through it in line with the screw, a pivot pin having one end rotatably and slidably mounted in said opening and having its opposite end rotatably supported by said bearing surface, a permanent bar magnet rigidly mounted on the pin and normally held in alignment with said central portion of said member by its magnetic attraction therefor, and a pointer operatively connected to the pin and adapted to be swung thereby when current flowing through said member swings the magnet, adjustment of the screw serving to vary the distance between the magnet and said central portion of said member to control the restoring force exerted on the magnet, whereby to calibrate the ammeter.

2. An ammeter comprising a current-carrying steel strip having a centrally located threaded hole through it, a screw threaded in said hole and having a bearing surface at its inner end, a bearing member spaced from said surface and having an opening through it in line with the screw, a pivot pin having one end rotatably and slidably mounted in said opening and having its opposite end rotatably supported by said bearing surface, a permanent bar magnet rigidly mounted on the pin and normally held in alignment with the adjacent portion of the strip by its magnetic attraction therefor, and a pointer operatively connected to the pin and adapted to be swung thereby when current flowing through the strip swings the magnet, adjustment of the screw serving to vary the distance between the magnet and strip to control the restoring force exerted on the magnet, whereby to calibrate the ammeter.

3. An ammeter comprising a current-carrying steel strip having a straight portion provided with a threaded hole through its center, a screw threaded in said hole and having an axial recess in its inner end, a bearing member spaced from said recess and having an opening through it in line with the screw, a pivot pin having one end rotatably and slidably mounted in said opening and having its opposite end rotatably mounted in said recess, a straight rectangular permanent magnet rigidly mounted on the pin and normally held in alignment with said straight portion of the strip by its magnetic attraction therefor, and a pointer operatively connected to the pin and adapted to be swung thereby away from zero setting when current flowing through the strip swings the magnet, adjustment of the screw serving to vary the distance between the magnet and strip to control the restoring force exerted on the magnet, whereby to calibrate the ammeter.

4. An ammeter comprising a current-carrying steel strip having a straight rectangular portion provided with a threaded hole through its center, a screw threaded in said hole and having an axial recess in its inner end, a bearing member spaced from said recess and having an opening through it in line with the screw, a pivot pin having one end rotatably and slidably mounted in said opening and having its opposite end rotatably mounted in said recess, a straight rectangular permanent magnet rigidly mounted on the pin, the magnet being substantially the same width throughout its length as said straight portion of the strip and normally held in alignment with said portion by its magnetic attraction therefor, and a pointer operatively connected to the pin and adapted to be swung thereby when current flowing through the strip swings the magnet, adjustment of the screw serving to vary the distance between the magnet and strip to control the restoring force exerted on the magnet, whereby to calibrate the ammeter.

5. An ammeter comprising a current-carrying steel strip having end portions adapted to be connected in an electric circuit, a strip of a non-magnetic metal extending along one side of said steel strip and having better current conducting properties than the steel strip, the central portion of said strips having a hole therethrough provided with a screw thread, a screw threaded in said hole and having its inner end adjacent the non-magnetic strip and provided with a bearing surface, a bearing member spaced from said surface and having an opening through it in line with the screw, a pivot pin having one end rotatably and slidably mounted in said opening and having its opposite end rotatably supported by said bearing surface, a permanent bar magnet rigidly mounted on the pin and normally held in alignment with the adjacent portion of the steel strip by its magnetic attraction therefor, and a pointer operatively connected to the pin and adapted to be swung thereby when current flowing through said strips swings the magnet, adjustment of the screw serving to vary the distance between the magnet and strips to control the restoring force exerted on the magnet, whereby to calibrate the ammeter.

JOHN E. DIEHL.

REFERENCES CITED

The following references are of record in the file of this patent:

UNITED STATES PATENTS

| Number | Name | Date |
| --- | --- | --- |
| 348,648 | Weston | Sept. 7, 1886 |
| 425,069 | Garver | Apr. 8, 1890 |
| 683,668 | Suren | Oct. 1, 1901 |
| 1,192,821 | Roller | July 25, 1916 |
| 1,333,422 | Kaisling | Mar. 9, 1920 |
| 1,452,591 | Broggen | Apr. 24, 1923 |
| 1,680,465 | Mason | Aug. 14, 1928 |
| 1,749,366 | Zubaty | Mar. 4, 1930 |